(12) United States Patent
Washington, IV et al.

(10) Patent No.: US 12,018,770 B2
(45) Date of Patent: Jun. 25, 2024

(54) MECHANICAL AND COMBINED MECHANICAL/ELECTRONIC ACTUATOR FOR ANHYDROUS AMMONIA EMERGENCY SHUT OFF VALVES

(71) Applicant: Squibb Taylor, Inc., Dallas, TX (US)

(72) Inventors: William Browning Washington, IV, Dallas, TX (US); Jack Jay Potts, Dallas, TX (US); William Henry Sands, III, Dallas, TX (US)

(73) Assignee: Squibb Taylor, Inc., Dallas, TX (US)

( * ) Notice: Subject to any disclaimer, the term of this patent is extended or adjusted under 35 U.S.C. 154(b) by 0 days.

(21) Appl. No.: 18/115,679

(22) Filed: Feb. 28, 2023

(65) Prior Publication Data

US 2023/0313907 A1 Oct. 5, 2023

Related U.S. Application Data

(60) Provisional application No. 63/314,969, filed on Feb. 28, 2022.

(51) Int. Cl.
*F16K 31/46* (2006.01)
*A62C 3/06* (2006.01)

(52) U.S. Cl.
CPC ............. *F16K 31/465* (2013.01); *A62C 3/06* (2013.01)

(58) Field of Classification Search
CPC .................................................... F16K 31/465
See application file for complete search history.

(56) References Cited

U.S. PATENT DOCUMENTS

| | | |
|---|---|---|
| 1,596,968 A | 8/1926 | Hansen et al. |
| 1,808,765 A | 6/1931 | Walter |
| 2,218,606 A | 10/1940 | Foster |
| 2,223,292 A | 11/1940 | Maxon |
| 2,850,258 A | 9/1958 | Branko |
| 2,936,997 A | 5/1960 | Nichells |
| 3,584,650 A | 6/1971 | Macaulay |
| 3,591,988 A | 7/1971 | Price |
| D256,607 S | 8/1980 | Carlin |
| 4,458,609 A * | 7/1984 | Tofte ...................... F28D 7/103 62/48.1 |
| D284,989 S | 8/1986 | Fetty |
| D297,971 S | 10/1988 | Kiyota et al. |
| 4,945,579 A | 8/1990 | Husting |
| D380,526 S | 7/1997 | Pullen |
| 6,752,373 B1 | 6/2004 | Rudy et al. |
| D514,528 S | 2/2006 | Beaton |
| D559,790 S | 1/2008 | Okuno |
| D615,047 S | 5/2010 | Zheng |
| D745,640 S | 12/2015 | Russell et al. |

(Continued)

*Primary Examiner* — Kevin R Barss
(74) *Attorney, Agent, or Firm* — Ferguson Braswell Fraser Kubasta PC

(57) ABSTRACT

In various implementations, a manual actuator may be coupled to a valve to provide the ability to shut off anhydrous ammonia flow through the valve remotely (e.g., in emergencies). The valve may be coupled to anhydrous ammonia tanks, such as nurse tanks and/or storage tanks. The manual actuator may include manual release member, a breakaway member, a handle, and pull cord(s). The handle may allow a coupled valve to be opened and/or closed. The handle may allow the valve to be shut off at the valve, in some implementations. The pull cord(s) may allow a coupled valve to be remotely closed.

20 Claims, 9 Drawing Sheets

(56) References Cited

U.S. PATENT DOCUMENTS

| | | |
|---|---|---|
| D822,173 S | 7/2018 | Yung |
| D836,754 S | 12/2018 | Johanning et al. |
| D858,712 S | 9/2019 | Le et al. |
| D886,954 S | 6/2020 | Gabriel |
| D887,813 S | 6/2020 | Burns et al. |
| 2003/0234043 A1* | 12/2003 | Miller .................... F16K 35/10 137/382 |
| 2012/0161046 A1 | 6/2012 | Tsai |
| 2017/0215335 A1* | 8/2017 | Sudbrink ............... A01C 5/062 |

* cited by examiner

MECHANICAL AND COMBINED MECHANICAL/ELECTRONIC ACTUATOR FOR ANHYDROUS AMMONIA EMERGENCY SHUT OFF VALVES

CROSS-REFERENCE TO RELATED APPLICATION

This application claims the benefit of priority to U.S. Provisional Patent Application 63/314,969, filed on Feb. 28, 2022 and entitled "Mechanical and Combined Mechanical/Electronic Actuator for Anhydrous Ammonia Emergency Shut Off Valves," which is related to U.S. patent application Ser. No. 17/020,249 filed on Sep. 14, 2020 and entitled "Electronic Actuator for Anhydrous Ammonia Emergency Shut Off Valves", which is a continuation of U.S. patent application Ser. No. 16/243,076, filed on Jan. 8, 2019 and entitled "Electronic Actuator for Anhydrous Ammonia Emergency Shut Off Valves", which claims the benefit of priority to U.S. Provisional Patent Application 62/695,594, filed on Jul. 9, 2018 and entitled "Electronic Actuator for Anhydrous Ammonia Emergency Shut Off Valves", all of which are incorporated by reference herein for all purposes.

TECHNICAL FIELD

The present invention relates to actuator(s) for valves in anhydrous ammonia emergency shut off valves.

BACKGROUND

Anhydrous ammonia storage and transport are dangerous due to the toxicity of ammonia gas and the explosion risks of anhydrous ammonia. However, anhydrous ammonia is widely used as a nitrogen fertilizer. Even during regular operations, such the transfer of anhydrous ammonia from storage tanks to nurse tanks and the application of anhydrous ammonia to fields, there is a risk of injury to operators due to contact and inhalation. Additionally, the use of anhydrous ammonia in enclosed spaces (e.g., refrigerant applications) can cause fire and/or explosions. Thus, balancing safe storage and transport with expense and practicality is a common struggle.

Currently, anhydrous ammonia storage tanks include screw valves that can be manually actuated to shut off a valve in an emergency and excess flow valves. However, it is difficult to reach a screw valve on a tank in emergency scenarios (e.g., operators may become quickly overcome by noxious gases during a leak, may be injured in a rollover event, etc.) and/or may require an uninjured participant to manually actuate the valve. Excess flow valves are often not activated in many types of emergencies, and thus do not provide a fail safe in long pipe runs. Excess flow valves are also sensitive to valve sizing which reduces the practical ability to rely on them (e.g., over and under sizing valves can cause performance failures).

SUMMARY

In various implementations, a manual actuator may be coupled to a valve to provide an emergency shut off valve assembly. A pull cord, which may be activated remote to the valve, may trigger the emergency shut off and cause the valve to close. Thus, a remote worker (e.g., in the field or not in the field) can close valve(s) in an emergency, during maintenance, and/or for any other appropriate purpose. Use of the mechanical actuator (e.g., electromagnetic) may increase safety during use, storage, and/or transport of anhydrous ammonia.

In various implementations, the manual actuator may be coupled to a valve of a tank holding anhydrous ammonia. The manual actuator may allow the valve to be quickly closed from a location remote to and/or at the valve. The ability to remotely close the valve may decrease chance of operator injury and/or field damage. The manual actuator may include a manual release member, a pull cord and a handle. The handle may be coupled to the valve such that the handle may be rotated to open and/or close the valve. The manual actuator may be operated via the pull cord to allow the handle to quickly return to a closed position (e.g., the handle is in a position associated with a closed valve). The manual actuator may include one or more breakaway members to reduce the likelihood that force on a pull cord and/or other component causes excess force on the valve or other components of the manual actuator.

In various implementations, the manual release of the mechanical valve may include a pin that extends from a housing of the manual release. A spring may retain the pin in an extended position but allow the pin to retract at least partially in the housing. The pin may be disposed in a path of the handle. When a handle is disposed in the open position, the extended pin may retract to allow the handle to pass (e.g., and be disposed in an open position), and automatically return to an extended position once the handle passes the position of the pin due to the spring acting on the pin. The extended pin may retain the handle in the open position (e.g., when the valve is a spring that returns to a closed position). The pull cord of the mechanical actuator may be coupled to the pin such that the pull cord may retract the pin and allow the handle to rotate to a closed position (e.g., associated with a closed valve).

The breakaway components of the mechanical actuator may include a breakaway member that couples a segmented pull cord (e.g., such that a portion of the breakaway member fails and allows the segments of the pull cord to separate). The mechanical actuator may include other breakaway components such as a breakaway wall of a pin that breaks and releases a pull cord rather than transmit a force greater than a predetermined force to a valve.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Figure 1A:
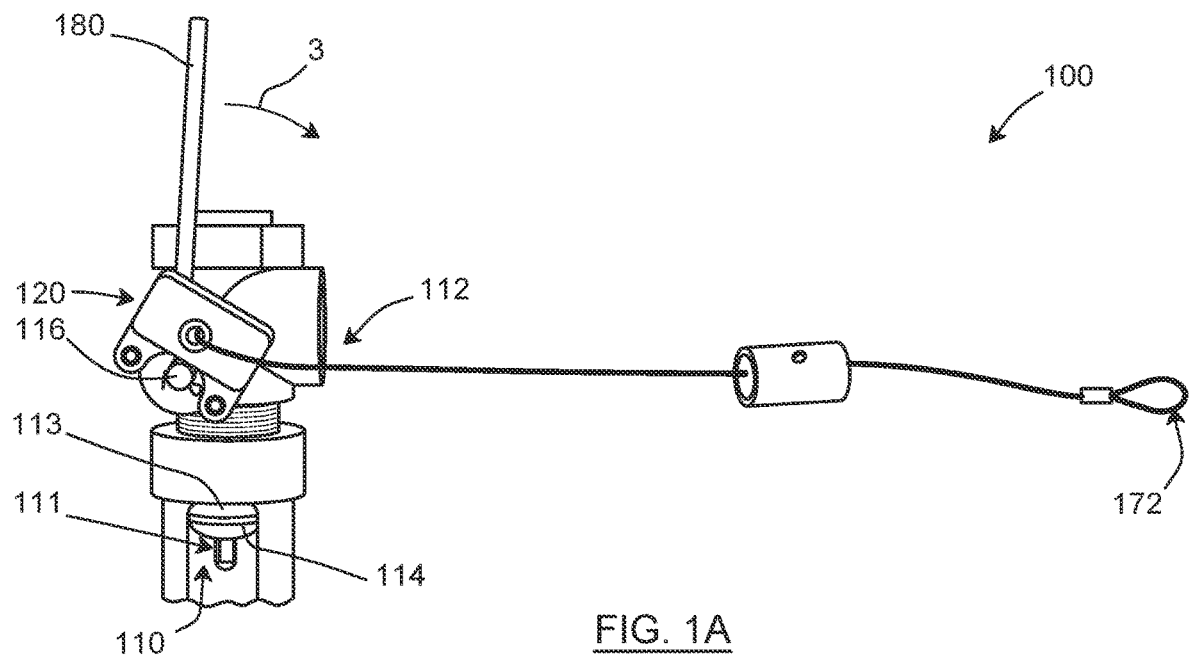
FIG. 1A illustrates an implementation of an example manual actuator in which the valve is closed.

Anhydrous ammonia has wide industrial and agricultural use; however, there is a high risk of operator injury due to contact and/or inhalation with anhydrous ammonia from use, due to leaks, and/or mishandling. Anhydrous ammonia can cause respiratory issues, burns, and has explosive potential. Often, when anhydrous ammonia leaks from nurse tanks, operators are quickly overcome as the leaking anhydrous ammonia quickly vaporizes and overtakes the atmosphere proximate the leak. Operators may have respiratory issues, become incapacitated, and/or have trouble reach the nurse tank to control the leak. Nurse tanks also frequently transported and/or used in systems together (e.g., in series or in parallel to increase size of the application area before refill of the tank). However, often one of the nurse tanks may become disconnected (e.g., a connection becomes fatigued, a line coupling the tanks gets caught and breaks, field conditions cause a tank to get stuck and/or tip over, etc.) and start to leak. Leaks also potentially can damage agricultural crops (e.g., in over application due to leaks). Thus, an actuator capable of being used with anhydrous ammonia valves, that inhibits leaks during transport, when the nurse tank is not in use, when nurse tanks become disconnected, that allows remote emergency shut off may inhibit injury to operators, inhibit damage to the environment, and/or reduce costs (e.g., due to leaked resources, damaged agriculture, and/or liability) is needed.

Due to the chemical and physical properties of anhydrous ammonia, specialty valves are utilized when storing, transporting, and controlling fluid flow of anhydrous ammonia. The valves may be safety valves that control flow (e.g., operational flow and/or excess flow) and/or provide emergency shut off. In some implementations, excess flow valves may be used, but due to the nature of anhydrous ammonia transportation and/or application the excess flow valve may not inhibit leaks (e.g., the amount of anhydrous ammonia being released may not be sufficient to close the excess flow valve; however, the amount may be great enough to cause injure individuals and/or damage agriculture). Thus, the described actuator(s) may be utilized with excess flow valves and/or other types of control valves.

An anhydrous ammonia valve may be coupled to a tank, which is at least partially filled with anhydrous ammonia. For example, the tank may include storage tanks, nurse tanks, and/or any other appropriate type of tank. The valve may connect the tank(s) (e.g., directly and/or indirectly via a coupler) to one or more hoses. The hose may allow fluid to flow from the tank via the valve to application devices (e.g., toolbars, applicators, etc. to fertilize a field) and/or to another tank (e.g., from a storage tank to a nurse tank or vice versa; on a truck; etc.).

The anhydrous ammonia valve may include a manual actuator that is capable of adjusting the position (e.g., open and/or close) of the valve. For example, the manual actuator of the anhydrous ammonia valve may provide an emergency shut off of the fluid flow through the valve. Thus, if leakage is identified, a hose becomes disconnected, equipment is damaged that causes leakage, and/or if injury to an individual occurs, the valve may be shut down via a switch (e.g., pull cord) of the manual actuator.

In various implementations, a valve may have at least one open position and a closed position. Valves for use with anhydrous ammonia are commonly and commercially available (see e.g., valves available from Squibb Taylor (Dallas, Texas)). For example, a valve may allow multiple open positions to adjust the amount of fluid allowed to flow through the valve. A mechanical actuator may be coupled to the valve to control the position in which a valve is disposed. The mechanical actuator may allow emergency shut off of the fluid flow from the valve, in some implementations.

Figure 1B:
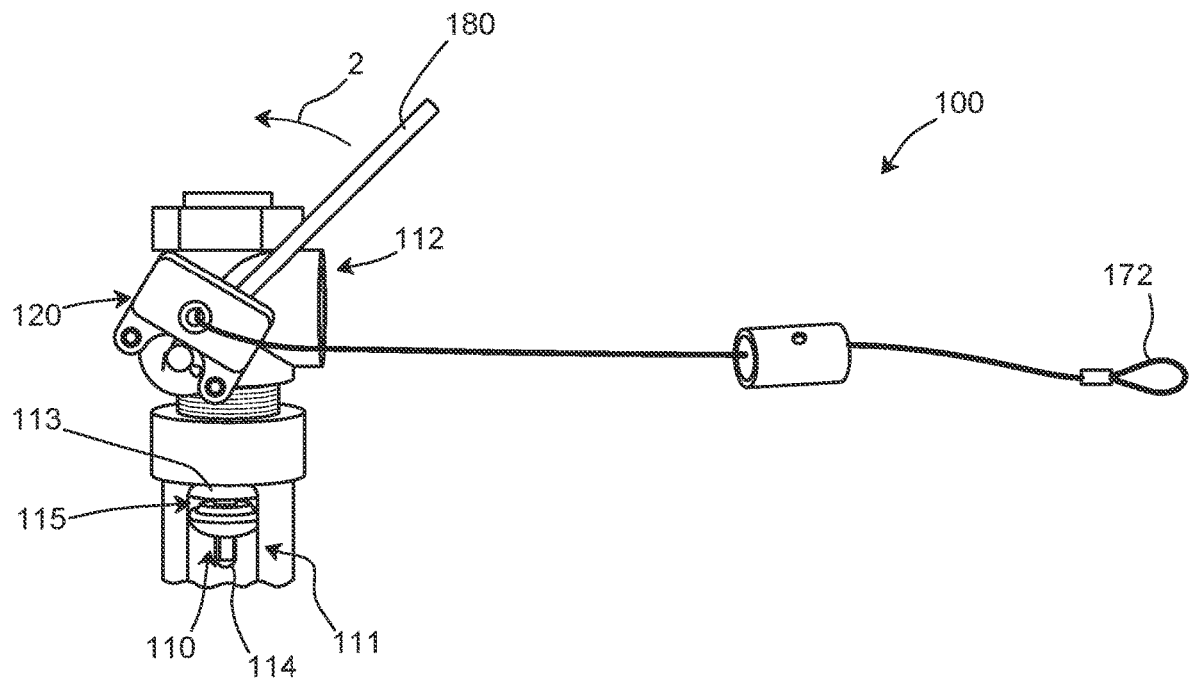
FIG. 1B illustrates an implementation of the example manual actuator, illustrated in FIG. 1A, in which the valve is open.

FIG. 1A illustrates an implementation of an example valve assembly 100, which includes a valve 110 and a mechanical actuator 120, in a closed position and FIG. 1B illustrates the example valve assembly 100 in an open position. As illustrated, the valve assembly 100 includes a valve 110 and a mechanical actuator 120. The valve 110 may have a first end 111 that may be coupled to and/or disposed at least partially in a tank (e.g., nurse tank) and a second end 112 coupled to the actuator 120. When the valve 110 is open, as illustrated in FIG. 1B, a gap 115 may reside between the first part 113 of the valve disk and the second part 114 of the valve disk to allow fluid to flow from the tank through the gap and to connected lines (not shown). When the valve 110 is closed, as illustrated in FIG. 1A, the first part 113 of the valve disk may contact the second part 114 of the valve disk to inhibit fluid passage through the valve. The valve 110 may include a spring (not shown) that closes and/or maintains the valve in a closed position unless a force acts on the valve and/or spring to open the valve, in some implementations. Thus, the valve 110 may close automatically when the force maintaining an opening position of the valve is removed.

A second end 112 of the valve 110 may be coupled to one or more hose(s) (e.g., indirectly or directly) and/or the mechanical actuator 120. The valve may include an opening in line with the opening to the tank and/or at an angle. The valve may include multiple openings at multiple angles (e.g., 180, 90, 270, 70, etc.) that can be coupled to hoses and/or capped, in some implementations. For example, one or more hoses may be coupled to the valve to transport fluids from the tank to another tank and/or to field applicators. The valve 110 may include a valve position member (e.g., coupled to and/or including the valve stem) that is movable by the manual actuator 120 to adjust the position of the valve. For example, the valve position member may rotate to adjust the position of the valve from closed (e.g., as illustrated in FIG. 1A) and an open position (e.g., as illustrated in FIG. 1B). Rotation of the member 13 in direction 2 closes the valve and rotation of the member 13 in direction 3 opens the valve.

The mechanical actuator 120 may be coupled to the valve 110 and may be capable of adjusting the position of the valve. FIG. 1C illustrates a partially unassembled view of the example mechanical actuator 100 of the valve assembly 100 and FIG. 1D illustrates a partially exploded view of the mechanical actuator. The mechanical actuator 120 may include components such as a manual release member 130, a breakaway member 150, pull cord(s) 170, and a handle (e.g., a lever) 180. The components may operate together to allow a user to open and/or close the valve 110 via the handle 180 and remotely close the valve via the pull cord(s) 170.

Figure 3:
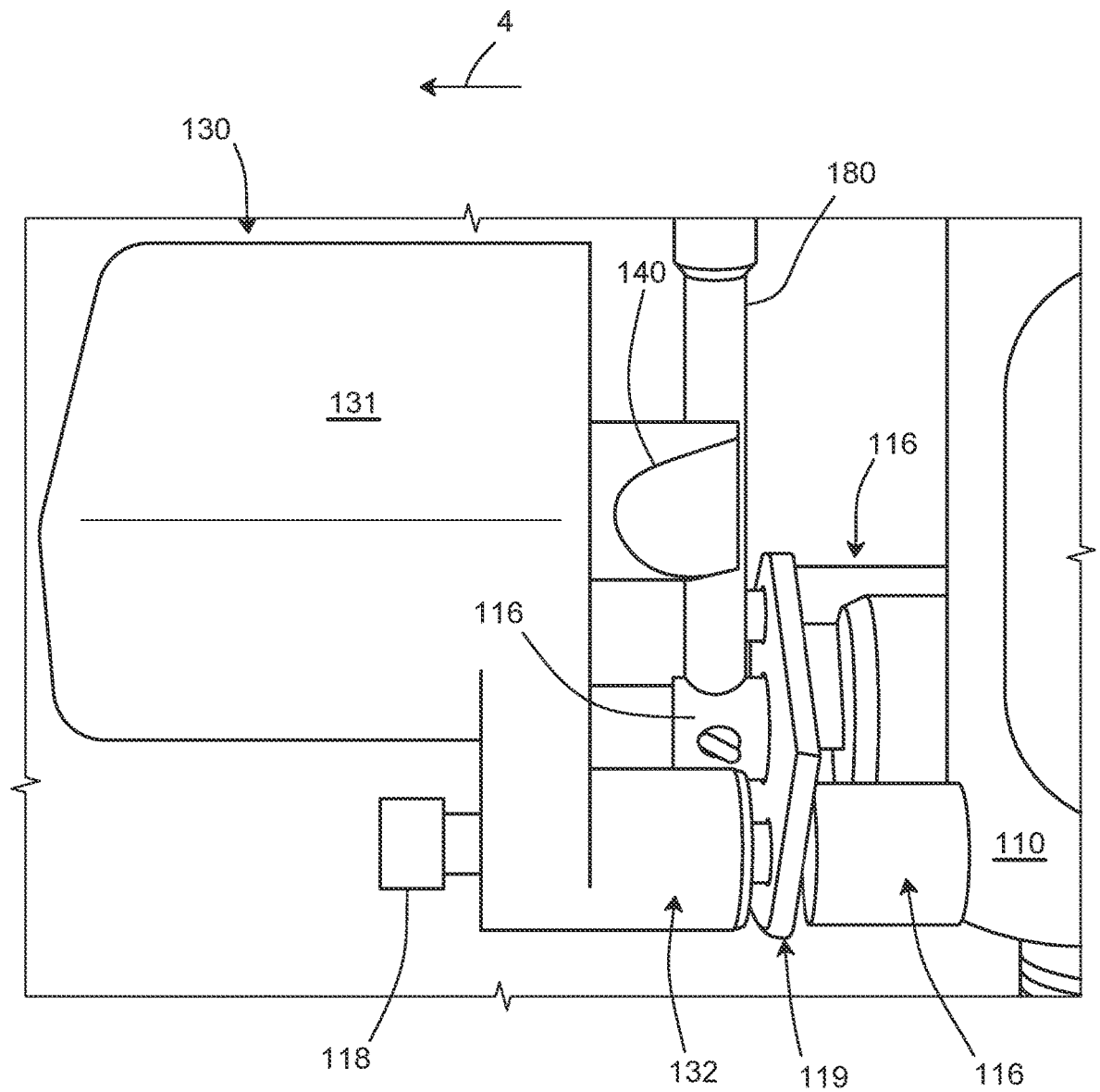
FIG. 3 illustrates an implementation of portion of an example manual actuator.

As illustrated in FIG. 3, the manual release member 130 and the handle 180 may be coupled to the valve 110. The manual release member 130 may include a housing 131 with one or more legs 132. FIGS. 4A-E illustrate the manual release member housing 131. As illustrated, the body of the manual release member may include two legs 132 extending in the same direction away from the body. For example, the manual release member housing 131 may include a first side 131a, proximate the coupling with a valve; a second opposing side 131b; and a third side 131c, fourth side 131d, fifth side 131e, and sixth side 131f disposed between the first side and the second side of the manual release member housing. The legs may extend from the body of the housing on the first side 131a. The legs 132 include an opening 133 (e.g., with or without threads disposed in an inner surface) that is capable of receiving a fastener 118. To couple the manual release member to the valve 110, fastener(s) may be positioned through the openings 133 in the legs of the manual release member and into receiving members 116 of the valve.

In some implementations, a plate 119 may be disposed between the coupling of the manual release member components and the valve receiving members. The valve positioning member of the valve may extend through the plate, in some implementations, and the handle 180 may couple with the valve positioning member on the same side of the plate as the manual release member 130. Thus, the movement of the handle in directions 2 and 3 may open and/or close the valve via the connection with the valve positioning member. In some implementations, the valve positioning member of the valve 110 may include an opening through which the handle 180 may be at least partially disposed. A fastener (e.g., a cotter key fastener) 118 may couple and maintain the connection between the handle and the valve 110. The coupling between the handle and the valve may allow rotation of the handle to control the valve (e.g., open and/or close the valve).

Figure 4A:
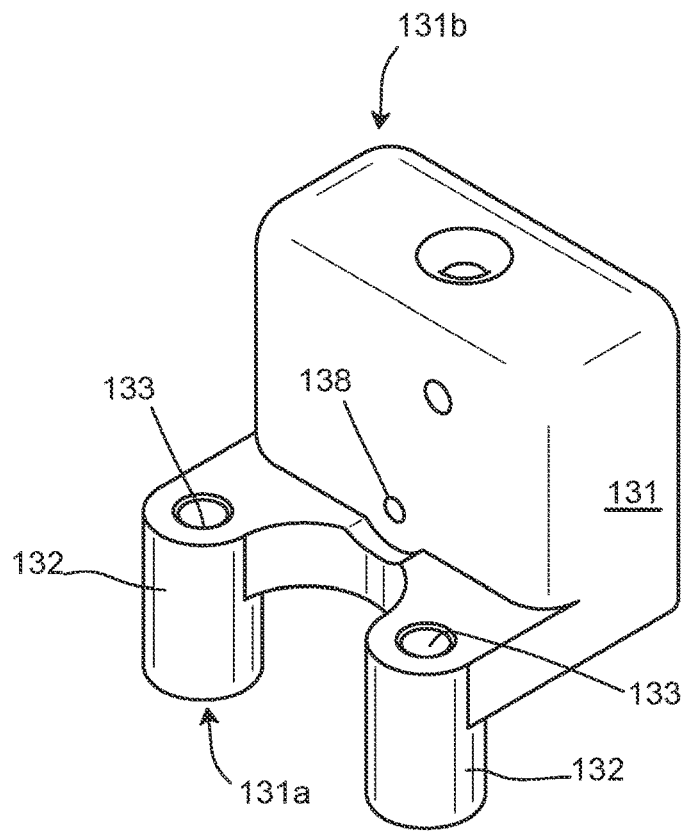
FIG. 4A illustrates a first side perspective view of an implementation of a manual release member of an example manual actuator.
Figure 4B:
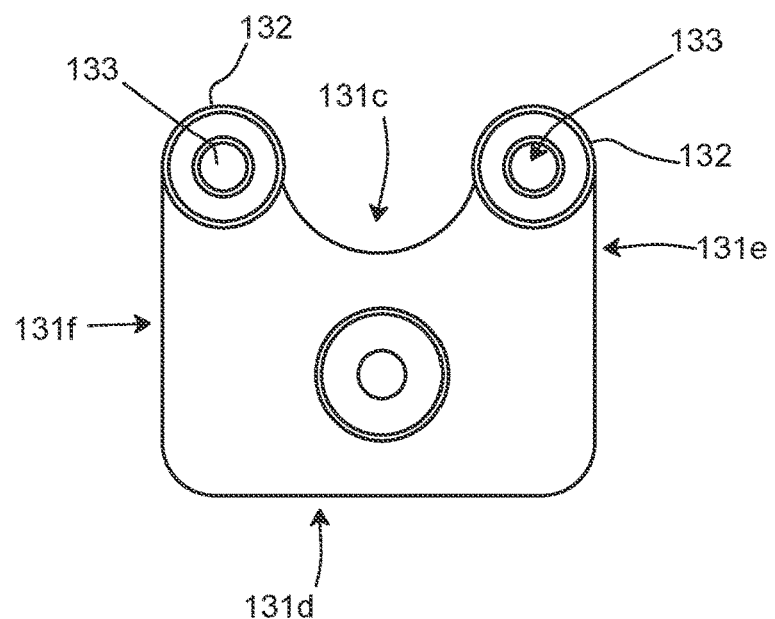
FIG. 4B illustrates a side view of the first side of the implementation of a manual release member, illustrated in FIG. 4A.
Figure 4C:
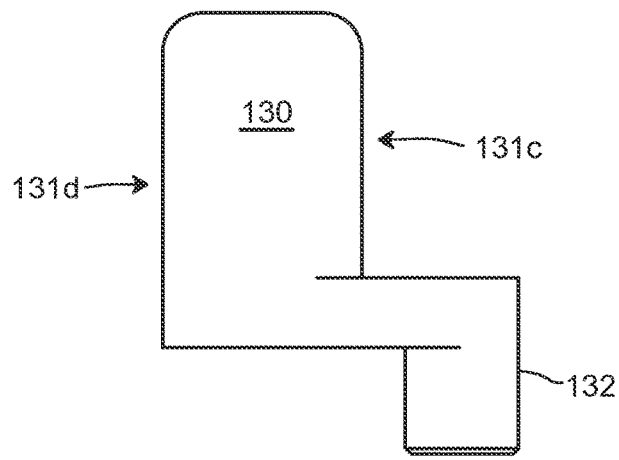
FIG. 4C illustrates a second side view of the implementation of the manual release member, illustrated in FIG. 4A.
Figure 4D:
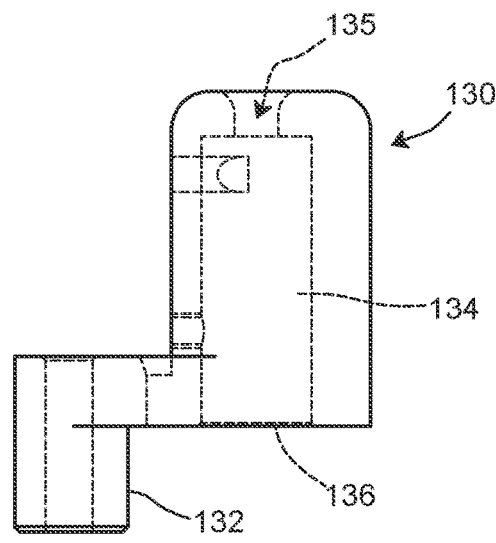
FIG. 4D illustrates a third side view of the implementation of the manual release member, illustrated in FIG. 4A.
Figure 4E:
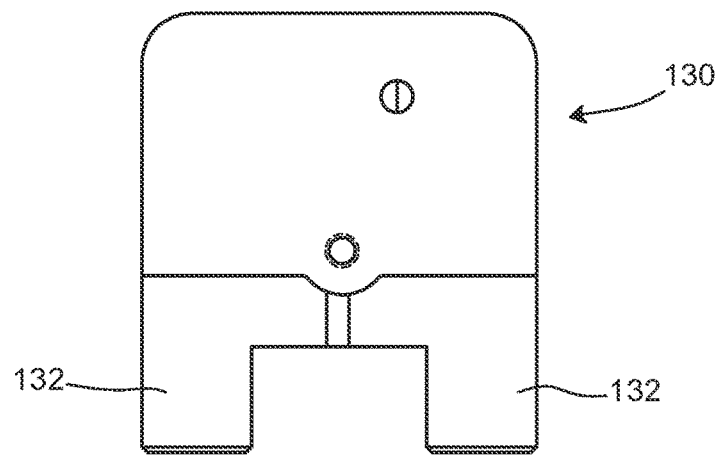
FIG. 4E illustrates a fourth side view of the first side of the implementation of the manual release member, illustrated in FIG. 4A.

As illustrated in FIG. 4D, the manual release member 130 may include a cavity 134 in the body of the housing. The cavity 134 may extend through the housing 131 include first cavity opening 135, on the second side 131b of the housing, and second cavity opening 136, on the first side 131a of the housing.

Figure 2A:
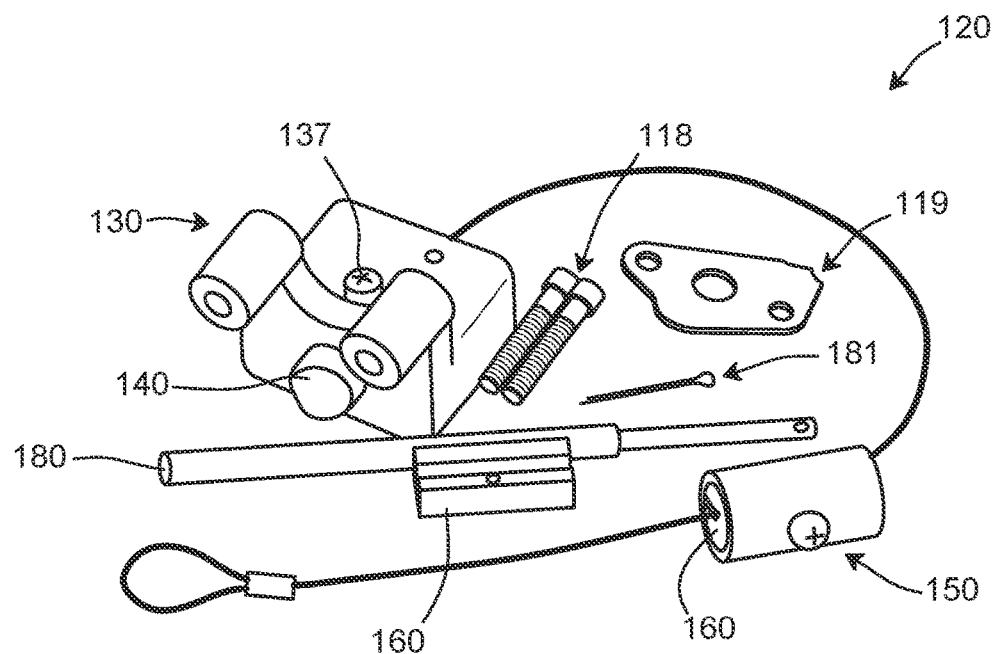
FIG. 2A illustrates an implementation of a partially disassembled example manual actuator.
Figure 2B:
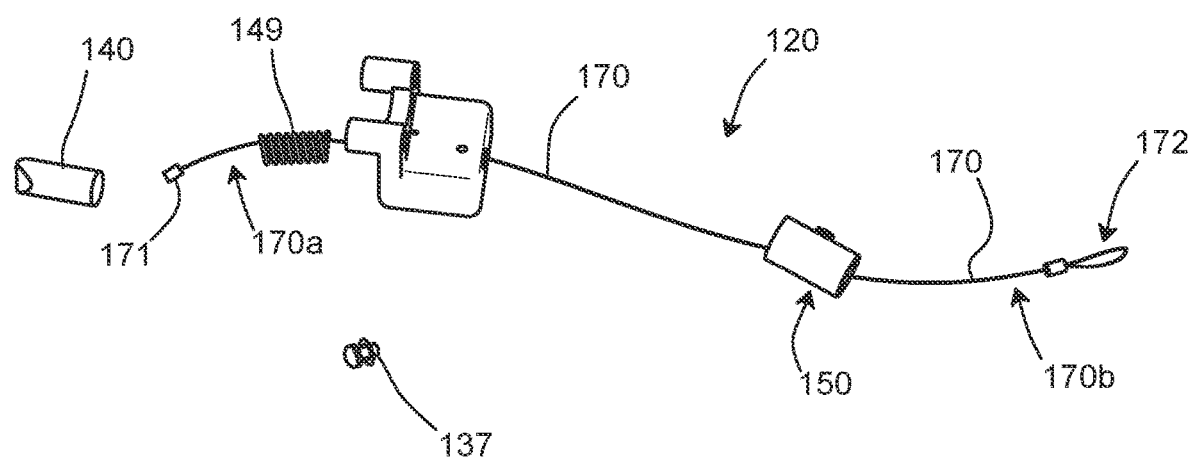
FIG. 2B illustrates a partial exploded view of an implementation of the example manual actuator illustrated in FIG. 2A.

A pin 140 and a spring 149 of the manual release member 130 may be disposed at least partially in the cavity 134 (e.g., as illustrated in FIGS. 2B and 3). The spring 149 may act on the pin 140 to maintain the pin in a first position (illustrated in FIG. 3). When the spring is compressed the pin 140 may retract (e.g., in direction 4) towards the second side 131b of the housing 131 of the manual release member 130 such that a greater portion of the pin is disposed in the cavity 134 of the housing 131 of the manual release member 130 than when the pin is disposed in the first position.

The pin 140 may extend out of the cavity 134 via second cavity opening 136 on the first side 131a of the housing 131. FIGS. 5A-E illustrate various side views of an implementation of an example pin 140. The pin 140 may include a first end 140a; a second opposing end 140b which is disposed proximate the spring 149, and sides disposed between the first end and the second end. The pin 140 may have an at least partially cylindrical body and/or any other appropriate regular or irregular shape. The first end 140a may be tapered and/or include at least one tapered portion. The tapering may facilitate movement of the handle across the pin. In some implementations, the handle may be tapered on one side to allow the handle to be easily opened and not tapered on the other side to inhibit the handle opening. As illustrated in FIG. 3, the pin 130 may contact the handle when the pin is in the first position. When a user would like to change the position of the valve at the handle, the user rotates the handle in direction 2 or 3, as desired, and as the handle is rotated the handle pushes against the pin, which retracts (e.g., due to the force of the handle rotation being sufficient to compress the spring 149 disposed proximate the second end 140b of the pin 140). When the handle has cleared the pin (e.g., by being in the open or closed position), the removal of the force on the pin and thus the spring causes the pin to return to the first position. The pin may retain the handle in a position by the force of the spring exerted on the pin. For example, some valves may include a spring that maintains the valve in a closed position. This type of valve may be opened by maintaining a force on the handle and when this force is removed, the spring of the valve may automatically close the valve. The pin 140 and spring 149 of the manual release member 130 may maintain sufficient force on the handle to allow the valve to be maintained in an open position (e.g., overcoming the force exerted by the spring of the valve).

Figure 5A:
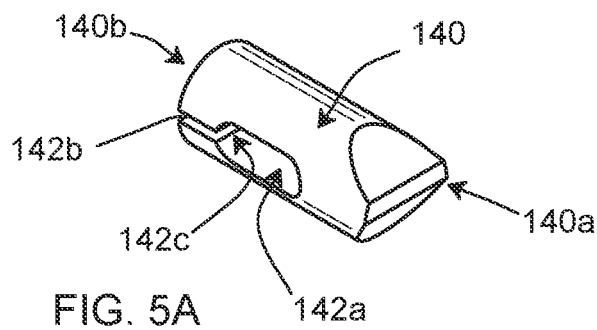
FIG. 5A illustrates a first perspective view of an implementation of a slide pin of an example manual actuator.
Figure 5B:
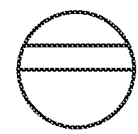
FIG. 5B illustrates a first side view of the implementation of a slide pin, illustrated in FIG. 5A.
Figure 5C:
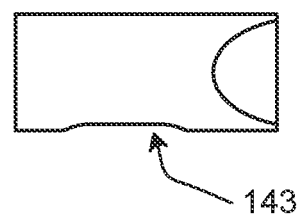
FIG. 5C illustrates a second side view of the implementation of a slide pin, illustrated in FIG. 5A.
Figure 5D:
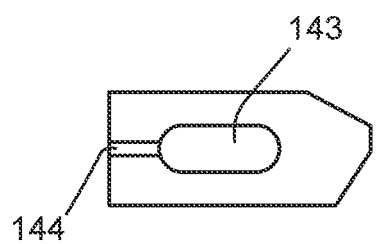
FIG. 5D illustrates a third side view of the implementation of a slide pin, illustrated in FIG. 5A.
Figure 5E:
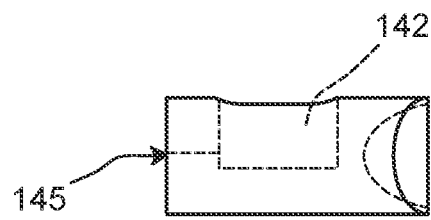
FIG. 5E illustrates a fourth side view of the implementation of a slide pin, illustrated in FIG. 5A.

As illustrated in FIGS. 5A-5B, the pin 140 may include a cavity 142 that extends through the side(s) of the pin and the second end 140b of the pin. The cavity may be a multi-part cavity, in some implementations. As illustrated, the cavity may include a first section 142a and a second section 142b. The first section 142a of the cavity 142 of the pin 140 may have a larger width than the second section 142b. In some implementations, the second section 142b may be a slot.

Thus, an inner wall 142c may reside between the interfaces of the first section 142a and the second section 142b of the cavity 142.

As illustrated, the openings of the cavity 140 formed in the side may include a first pin opening 143 and a second pin opening 144 and the opening formed in the second end of the pin 140b may include third pin opening 145. The width of the opening of the first pin opening 143 may be greater than width of the second pin opening 144. As illustrated, the width of the first opening may be approximately 0.3 to approximately 0.4 inches and/or the width of the second opening may be approximately 0.05 to approximately 0.07, in some implementations. As illustrated in FIG. 2B, at least a portion of the pull cord(s) 170 may reside at least partially in the cavity 142 of the pin 140. The pull cord 170 may include a first stop 171. The first stop 171 may have a greater diameter than the pull cord diameter. To allow insertion of the first stop 171 of the pull cord into the cavity 142 of the pin 140, the first opening may have a width greater than the diameter of the first stop. To inhibit release of the first stop 171 of the pull cord 170 from the pin, widths of the second pin opening 144 and the third pin opening 145 may be smaller than the diameter of the first stop 171. The widths of the second pin opening 144 and the third pin opening 145 may be greater than the diameter of the pull cord. Thus, to insert the first stop 171 in the cavity 142 of the pin, the first stop is inserted through opening 143 into cavity 142. The pull cord 170 coupled to the first stop 171 is inserted through openings 143, 144, and/or 145 to allow the pull cord 170 to exit the pin 140 on the second side 140b. The first stop, during use, may then be inhibited from exiting the pin 140, when a force is applied to the pull cord by contacting wall 142 (e.g., since the diameter of the first stop is greater than a width of the second section 142b of the cavity 142. As illustrated in FIG. 3, the pin is disposed in the cavity 134 of the housing 131 of the manual release member 130 such that the first opening 143 of the pin is within the housing 131. Thus, the first stop may be inhibited from release from the pin through the first opening 143 due to the housing 131 of the manual release member 130 (e.g., despite the size of the first opening being large enough for the first stop to pass through the opening).

During use, when the pull cord 170 is pulled, the stop 171 pushes against the wall 142c of the cavity to exert a force on the spring 149, which is disposed proximate the second side 140b of the pin 140. This force may at least partially compress the spring 149 and at least partially retract the pin 140 from the first position of the pin. Retracting the pin to a second position may allow the handle to move. In a spring activated closed valve, if the handle is in the closed position, retraction of the pin may not move the handle. However, if the handle is in the open position and the pin retracts to a second position, the spring of the valve may exert force on the valve positioning member and move the handle and the valve in the closed position.

At the first end of the pull cord 170, the first stop 171 may be disposed and at a second end of the pull cord a handle may be disposed, such as but not limited to a loop 172. In some implementations, the pull cord 170 may include segments. As illustrated in FIG. 2B, the pull cord may include a first segment 170a that includes the first stop, and a second segment 170b that includes the loop 172. Utilizing a segmented pull cord 170 may allow use of a breakaway member 150. The breakaway member may increase the safety and decrease the operational cost of the valve system. When a pull cord is engaged (e.g., pulled) it may be due to an operator pulling the cord or a dangerous situation such as but not limited to, tanks becoming disconnected from each other, a trailer, and/or tractor; hoses becoming caught, tangled, and/or broken, etc. These scenarios may cause excessive pull forces (e.g., greater than approximately 20 pounds, greater than 30 pounds) on the pull cord, which can cause damage to the valve itself. Since the pull cords often have high tensile strengths, the pull cord may not fail but instead transfer excess forces to the valve, which may be damaged by these forces (e.g., prior to the pull cord breaking). Thus, to reduce the likelihood that excessive forces are applied to the valve, a breakaway member may be utilized. The breakaway member may couple pull cord segments such that when a predetermined force is applied to the pull cord (e.g., 10 pounds), the pull cord may separate into segments. Thus, the force being applied to the second segment of the pull cord may no longer be applied to the first segment of the pull cord.

As illustrated in FIG. 1A-B and 2B, the breakaway member 150 may be disposed at a distance from the valve and/or manual release member 130. The breakaway member may be coupled to the tank to which the valve is coupled, in some implementations. Thus, in some implementations, the first segment of the pull cord may be shorter than the second segment of the pull cord. The position of the breakaway member 150 relative to the valve may be based on where concerns of excess force on the pull cord may reside, in some implementations.

Figure 6A:
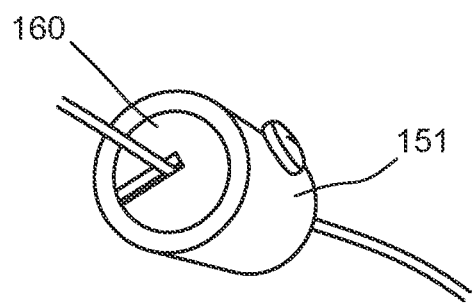
FIG. 6A illustrates a first side perspective view of an implementation of an example breakaway component of an example manual actuator.
Figure 6B:
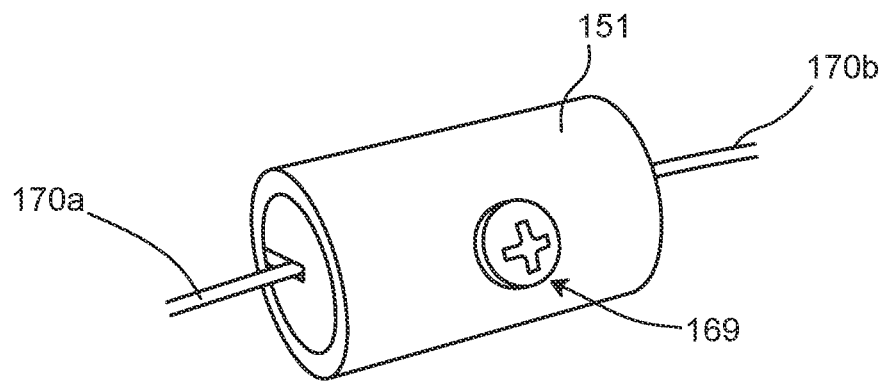
FIG. 6B illustrates a second side perspective view of the implementation of the breakaway component, illustrated in FIG. 6A.
Figure 6C:
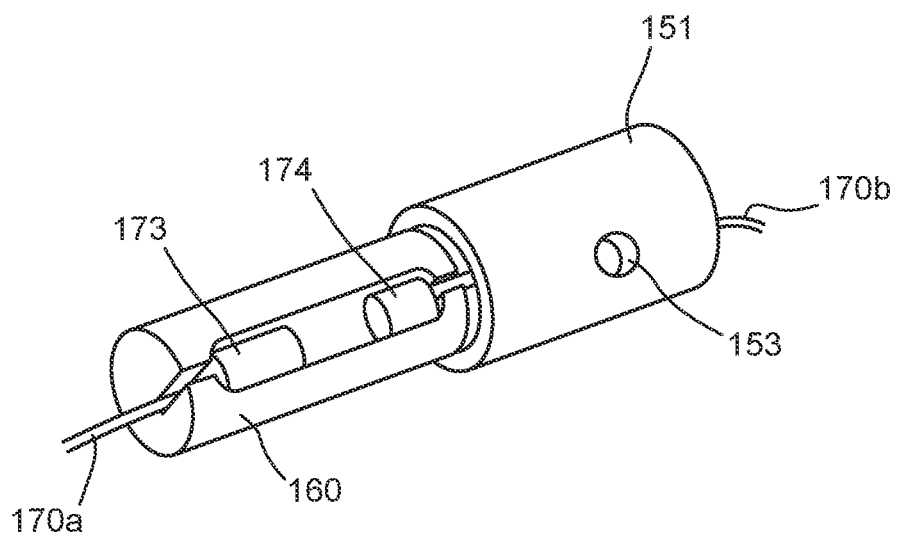
FIG. 6C illustrates an exploded view of the implementation of breakaway component, illustrated in FIG. 6A.
Figure 7A:
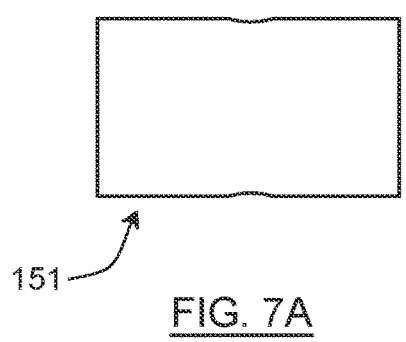
FIG. 7A illustrates a first side view of an implementation of a breakaway coupler of an example manual actuator.
Figure 7B:
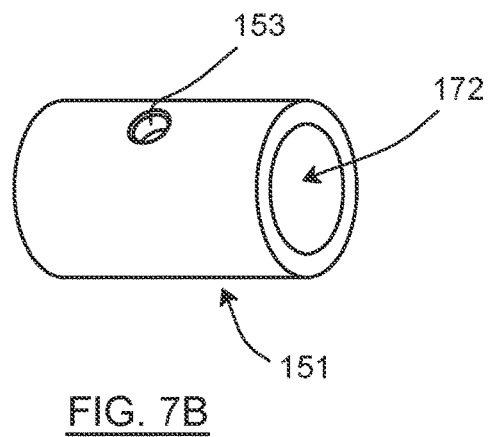
FIG. 7B illustrates a perspective view of a portion of the first side of the implementation of a breakaway coupler, illustrated in FIG. 7A.
Figure 7C:
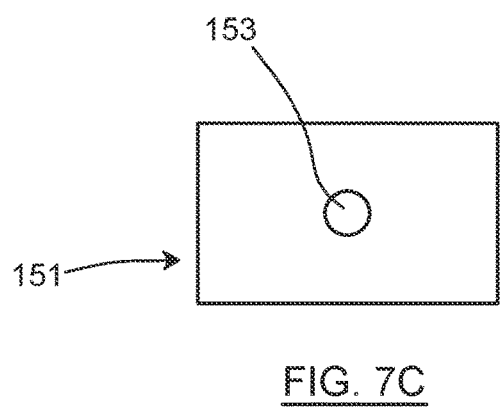
FIG. 7C illustrates a second side view of the implementation of a breakaway coupler, illustrated in FIG. 7A.
Figure 7D:
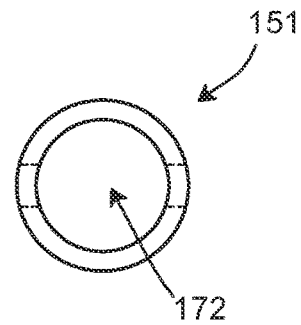
FIG. 7D illustrates a third side view of the implementation of a breakaway coupler, illustrated in FIG. 7A.
Figure 8A:
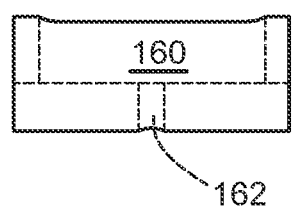
FIG. 8A illustrates a first side view of an implementation of a breakaway insert of an example manual actuator.
Figure 8B:
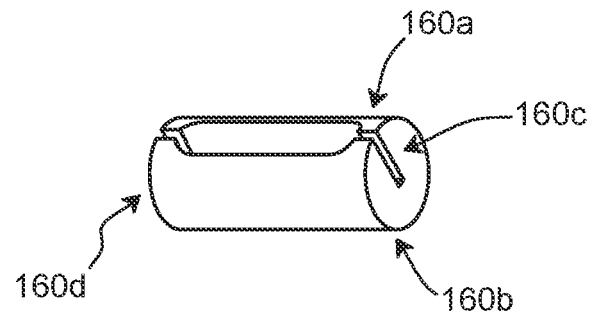
FIG. 8B illustrates a side perspective view of the implementation of a breakaway insert, illustrated in FIG. 8A.
Figure 8C:
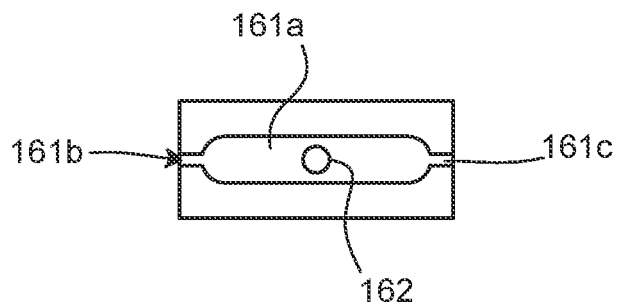
FIG. 8C illustrates a second side view of the implementation of a breakaway insert, illustrated in FIG. 8A.
Figure 8D:
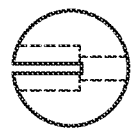
FIG. 8D illustrates a third side view of the implementation of a breakaway insert, illustrated in FIG. 8A.

FIGS. 6A-6C illustrate various views of an implementation of an example breakaway member 150. The breakaway member 150 may include a breakaway housing 151, a breakaway insert 160, and a fastener 169 to couple the breakaway insert to the breakaway housing 151. The first segment 170a of the pull cord 170 and the second segment 170b of the pull cord enter opposing sides of the breakaway insert.

FIG. 7A-D illustrate various views of the breakaway housing 151. As illustrated, the breakaway housing 151 includes a lumen 152 through opposing ends of the breakaway housing. The lumen 152 is configured to receive the breakaway insert 160. The breakaway housing 151 includes at least one opening 153 to receive a fastener 169. In some implementations, breakaway housing includes openings 153 on opposing sides such that a fastener is disposed at least partially in both openings and the breakaway insert to secure the breakaway insert to the breakaway housing.

FIGS. 8A-8D illustrate various views of the breakaway insert 160. As illustrated, the breakaway insert 160 includes a body with a cavity 161. The cavity may include a first section 161a that extends through a first side 160a of the breakaway insert. A second opposing side 161b of the breakaway insert may include an opening 162 that is capable of receiving the fastener 169 that couples the breakaway insert and the breakaway housing 161. The cavity 161 may include a second section 161b that extends through a first end 160c and a third section 161c that extends through the opposing second end 160d. The first section 161a of the cavity may be larger in width than the widths of the second section 161b and third section 161c, as illustrated. The opening 162 may or may not be disposed at approximately the center of the breakaway insert.

As illustrated in FIG. 6C, the cavity 161 of the breakaway insert is configured to receive and couple the first segment 170a of the pull cord 170 and the second segment of the pull cord. As illustrated in FIG. 2B, the first segment 170a may include a first stop 171 at a first end of the first segment of the pull cord. A second end of the first segment 170a may include a second stop 173, as illustrated in FIG. 6C. As illustrated in FIG. 2B, the second segment 170b of the pull cord 170 may include a loop 172 (e.g., for a user to more easily grasp the pull cord) at a first end. The second end of the second segment 170b may include a third stop 174. To couple the first segment 170a and the second segment 170b of the pull cord 170 via the breakaway member 150, the second stop 173 of the first segment and the third stop 174 of the second segment of the pull cord may be disposed in the cavity of the breakaway insert, which is disposed in the breakaway housing 151 and coupled via fastener 169. Since the opening of the first section 161a of the cavity 161 has a greater width than the second section 161b and the third section 161c, the second stop 173 of the first segment 170a of the pull cord 170 and the third stop 174 of the second segment 170b of the pull cord may be inserted through this opening on the side of the breakaway insert. Since the second section 161b and the third section 161c of the cavity 161 are smaller in width than the second stop and/or the third stop, the second stop and the third stop may be retained in the cavity 161 and the coupling between the first and second segments of the pull cord may be maintained.

In some implementations, one or more of the ends of breakaway insert may include a breakaway wall. The breakaway wall may be configured to fail (e.g., break) when subject to a predetermined force. As illustrated, the breakaway insert may include a material at least at one or more of the ends proximate the openings of the second section 161b and third section 161c of the cavity 161 that is configured to break when subject to a first predetermined force (e.g., 10 pounds). For example, at least a portion of the breakaway wall at an end of the breakaway insert may be include this material. The first predetermined force may be less than an amount of force considered to be excessive and/or damaging to a valve. Thus, when a force greater than the first predetermined force is applied to the second segment 170b of the pull cord 170, the third stop 174 will exert at least a portion of this applied force on an inner wall and/or end of a breakaway insert, rupturing the inner wall and/or of end of the breakaway insert and uncoupling the second segment 170b from the breakaway member 150. In some implementations, when a force greater than the first predetermined force is applied to the first segment 170a of the pull cord 170, the second stop 173 will exert at least a portion of this applied force on an inner wall and/or end of a breakaway insert, rupturing the inner wall and/or of end of the breakaway insert and uncoupling the first segment 170a from the breakaway member 150. Thus, valve and/or other components may be protected.

Use of the breakaway member 150 with the manual actuator 120 may protect the valve from excessive force (e.g., by breaking a connection between segments of a pull cord) and/or may reduce costs due to excessive force. For example, when excessive force is applied to a pull cord and an end of the breakaway insert is ruptured, to reinstate the breakaway member in service, the breakaway insert can be merely replaced. If the second segment of the pull cord is released from the breakaway segment, the breakaway insert may be separated from the breakaway housing by removing or at least partially unscrewing the fastener 169. The second stop 173 may then be removed from the cavity of the breakaway insert and inserted in a replacement breakaway insert. The third stop, previously uncoupled due to excessive force, may then be inserted into the cavity of the replacement breakaway insert and the breakaway insert may be place in the breakaway housing and coupled via fastener 169 (e.g., a replacement fastener or the same fastener). Thus, rather than replacing the manual actuator, a small component can be replaced, reducing the operating costs while increasing operational safety.

In some implementations, the manual actuator may include a secondary breakaway component. The pin may be configured such that when subject to excessive force, the pull cord may be released from the pin. For example, a pin may include a breakaway wall configured to break when subject to a predetermined force. As illustrated, at least a portion of the pin (e.g., second end 140b, wall 142c, and/or second section 142b of cavity) may include material configured to break or rupture when subject to a second predetermined force (e.g., 10 pounds, 20 pounds, 30 pounds, etc.). The second predetermined force under which the first segment of the pull cord will be released from the pin may or may not be similar to the first predetermined force under which the first segment and/or second segment of the pull cord may be released from the breakaway member. When a force greater than the second predetermined force is applied to the first segment 170a of the pull cord 170, the first stop 171 may exert at least a portion of this force on the wall 142b of the cavity 142 of the pin. This force may cause the wall 142c of the cavity of the pin and/or end 140b of the pin to rupture and release the first stop from the pin, which uncouples the first segment of the pull cord from the pin. The first stop may be smaller than the diameter of the spring 149 and the opening 135 in the housing 131 of the manual release member 130 such that the first segment may be uncoupled from the manual release member 130. The spring may remain in cavity 134 of the housing 131 of the manual release member when the first segment of the pull cord is released, in some implementations (e.g., to ease repair). When an end of the pin is ruptured, to reinstate the pin and thus the manual actuator in service, the pin can be merely replaced. The housing 131 of the manual release member may or may not be openable to allow access to the cavity. To reinstate the manual actuator after the pin has been ruptured or otherwise damaged, the first stop 171 and/or a portion of the first segment 170a of the pull cord 170 may be inserted through opening 135 in the housing 131 of the manual release member and the central opening of the spring disposed in the cavity 134, and/or through the opening 136. The first stop 171 of the first segment 170a may then be disposed in the cavity 142 of a replacement pin. Pulling of the first segment (e.g., external to the manual release member) may retract the pin at least partially into the housing to reset the pin in the manual release member. A fastener 137 may be disposed through opening 138 of the housing 131 of the manual release member 130 and at least partially into pin 140 (e.g., cavity of pin 140) to secure the pin to the manual release member in some implementations.

In some implementations, use of a second breakaway component such as the pin may increase the safety during operation. If the breakaway component fails and the second segment of the pull cord is not released (e.g., due to breakaway insert issues, entanglement, etc.), the use of a pin with breakaway capabilities will inhibit the force from being applied to the valve by rupturing and protecting the valve from excess forces.

The manual actuator may be utilized in conjunction with anhydrous ammonia tank(s) being stored and/or transported. The ability to remotely close a valve and stop the release of anhydrous ammonia may increase safety and reduce costs (e.g., due to damaged equipment, crops, etc.). For example, the manual actuator may be included on one or more tanks coupled together (e.g., on trailers hitched together, with hoses coupling each other, etc.). The manual actuator may inhibit and/or reduce leaks sustained when a tank separates from another tank. While some valves include excess flow valves, the nature of the flow when tanks are disconnected may not trigger the excess flow valve to close. However, the manual actuator may be engaged by the physical separation. For example, a pull cord of a manual actuator on a first tank may connect to another tank and/or a tractor, thus when the first tank becomes separated from the other tank and/or tractor (e.g., becomes unhitched, etc.), an excessive force may be applied to the pull cord (e.g., which is still in contact with the other tank and/or tractor). This force may pull on the pin of the manual actuator to retract the pin and allow the handle to close (e.g., if the valve was previously opened), if the force is greater than a predetermined force, the pull cord may then separate from the breakaway component and/or the pin. As another nonlimiting example, often lines between tanks and/or tanks and other components may become entangled and/or caught, which causes excessive forces to be applied to the pull cord. By utilizing the manual actuator, if excess forces are applied to the pull cord, whether due to separation, tangled lines, operator error, etc., the manual actuator will be able to automatically close the valve and inhibit damage to the valve by breaking at the breakaway component and/or pin.

In some implementations, the manual actuator(s) may be used in conjunction with electronic actuator(s), such as the electronic actuator(s) described in U.S. patent application Ser. Nos. 17/020,249, 16/243,076, and/or 62/695,594. For example, manual actuators may act as a redundancy in a set up. As another example, manual actuators may be coupled between tanks while a lead tank (e.g., closest to the tractor, primary flow handling, etc.) may include an electric actuator. The electric actuator may be triggered by the operator when the operator is subject to emergency conditions or would like to close the valve. In some implementations, closure of the lead tank may close flow from the coupled tanks as well.

In some implementations, conditions may arise that the operator is unaware of that may trigger the manual actuator. For example, visibility of all the tanks in a multi-tank set up may be low and an operator may not notice or may be slow to notice a disconnect tank, broken line, and/or tangled line. However, the force on a pull cord of a manual actuator may close the valve while the breakaway components may inhibit potential damage to the valve due to the forces acting on the valve from the pull cord.

In some implementations, the manual and the electronic actuator may be swappable. For example, a user may prefer a specific style for a particular application (e.g., the described manual actuator for some applications and described electronic actuators for other applications). Since the manual and the electronic actuator couple to a valve via similar mechanisms, the user may uncouple the fasteners (e.g., fasteners 118) to uncouple a first style of actuator and couple a second style of actuator to the same valve without modifying the valve itself. As another example, if a first style of actuator breaks or is in need of repair, a spare actuator can be coupled to the valve as a replacement independent of whether the first style was the same style as the spare actuator.

In various implementations, the safety of the manual actuator may be increased by the design of one or more of the components of the manual actuator. For example, by utilizing stops with shapes (e.g., cylindrical, spherical, ellipsoids, irregularly shaped, etc.) that are not easily couplable to other segments of the pull cord (e.g., as opposed to stops that terminate in loops or free ends of the pull cord), bypassing the breakaway components (e.g., breakaway member and/or pin with breakaway features) may be inhibited. This may increase safety for operators and/or increase compliance with government and/or industry guidelines. In some implementations, the safety of the manual actuator and thus the valve system may be increased by using the described low cost breakaway parts that can be replaced easily rather than requiring replacement of entire sections (e.g., which may act to discourage bypassing safety mechanisms to avoid the cost of replacement).

In various implementations, the ability to remotely close a valve may increase safety. A user may not need to approach the valve and/or tank, which may be leaking dangerous compounds (e.g., exposure to which may be hazardous). As another example, if a vehicle a user is driving overturns, the user and/or a remote user can activate the switch (e.g., while the user remains in the vehicle). Thus, injured drivers and/or remote users can still shut off the valve. Additionally, since the manual actuator may close valves when tangled in field accident (e.g., as opposed to commercial pull lines), the overall safety of the system may be increase. In some operations, users may not be able to safely approach the leak (e.g., in a tank and/or line), for example since exposure may cause the operator to have respiratory problems and/or pass out; thus, a remote switch may allow the valve to be closed while minimizing contact with the hazardous material.

In some implementations, the valve may operate as an emergency shut off valve and automatically close when excessive force is applied to the pull cord (e.g., which may signal dangerous conditions such as separation from other tanks and/or tractor; tractor roll over which causes excessive force to be applied; and/or tangled lines in the field. For example, the valve may close based on the activation of a switch coupled to the electromagnet and/or the power source of the electromagnet. Since the described valves are utilized with anhydrous ammonia, the emergency shut off valve feature of the described valves may facilitate compliance with regulations, industry standards, and/or generally increase safety since the valve defaults to a closed position rather than open position.

In various implementations, the manual actuator may include one or more locking members. Locking members may inhibit leakage, inadvertent opening of a valve, inadvertent closing of a valve during use, and/or theft. Locking member(s) of the actuator may facilitate compliance with regulations (e.g., government, insurance, etc.) and/or industry standards. Locking member(s) may decrease costs (e.g., by decreasing losses due to theft, inadvertent leaking, damage due to leaks, liability to operators due to leaks or malfunctions, etc.) For example, the handle may be latched in a closed position.

In various implementations, the manual actuator may be used to open and close the valve at the valve via the handle and remotely to close the valve.

Although FIGS. 1A-8D describe an implementation of an example valve assembly and components thereof, the valve assembly may or may not include these features and/or the valve assembly may include one or more other features. For example, the valve may be any appropriate type of anhydrous ammonia valve. The valve may include other types of valve disks than illustrated. The valve may include a flat or rounded valve disk assembly, such as where the second part 114 of the valve is flat or rounded. As illustrated, the valve may include a tapered valve disk assembly (e.g., a first part 113 and a second tapered part 114). The tapered valve disk assembly in combination with the manual actuator may increase laminar flow from hoses attached to the valve. By increasing laminar flow from the hose, providing a secure open position for the valve (e.g., via the electromagnetic connection holding the valve open), and by increasing safety (e.g., by providing a switch to allow emergency shut off), an operator may be capable of driving 10 miles an hour during common field applications as opposed to 5 miles an hour with conventional anhydrous ammonia safety valves.

The valve may include any appropriate valve for anhydrous ammonia including, but not limited to spring valves, safety valves, excess flow valves, bulkhead valves, etc. In some implementations, the valve may be a spring valve that includes a spring (not shown) that retains a valve in a closed position such that when a valve is released from an open position, the valve automatically returns to the closed position (e.g., via the spring). For example, opening the valve may expand the spring and when the force retaining the valve in an open position is released (e.g., electromagnetic is not magnetic and/or has a magnetic force less than the force applied by the spring), the spring may return to return to an initial state (e.g., less expanded state) and close the valve. In anhydrous ammonia tanks, use of spring valves may ensure closure and/or complete closure when disposing the valve in the closed position (e.g., since the force from the spring may fully close the tank). In some implementations, the valve may be an excess flow valve and may automatically close based on predetermined valve criteria (e.g., downstream pressure decreases greater than a predetermined amount such as when a hose breaks). Although excess flow valves may provide some protection against excess flows, in anhydrous ammonia applications, the use of the electronic actuator may inhibit other types of leaks. In some implementations, the described valves may be used in line with hoses and/or with tanks.

The valve may include any appropriate feature such as riser protection (e.g. in case of valve pull away from the tank), fire fuse, sensor (e.g., ammonia sniffer), fail-safe feature, etc. For example, the valve may include a fire fuse such that the valve may automatically close in the presence of a predetermined length of a predetermined elevated temperature (e.g., fire). One or more of the safety features may shut off the valve independently and/or in conjunction with the described valve assembly emergency shut off (e.g., when the switch is triggered in an emergency scenario). For example, a fire fuse in a valve may close the valve independently of the switch. As another example, a riser protection may be coupled to the switch such that it is capable of removing or cutting the power delivered to the electromagnetic component.

In some implementations, the handle may or may not include a gripper. For example, a user may hold the handle directly (rather than a gripper). The gripper of a handle may or may not be disposed proximate an end of the stem of the handle. The gripper may be removably coupled to the stem such that different styles of grippers may be utilized (e.g., bar, bar with cushioning, t-shaped bar, etc.) The gripper may be repositionable on the stem. For example, the gripper may be disposed on either a first side or the second opposing side of the stem, in some implementations. The stem may include an opening through the stem that is capable of receiving at least a portion of the gripper (e.g., via mating threads). The opening may allow the gripper to be coupled such that the gripper extends from the first side or the second side of the stem.

In some implementations, the handle 180 coupled to the valve positioner and/or the handle (such as loop 172) coupled to the pull line may include a feature to ease operation. For example, a handle may have an ergonomic shape or a shape to ease grasping (e.g., loop). As another example, a handle may include a gripper, which may have a texture and/or coating (e.g., polymeric, rubber, etc.) to facilitate holding the handle. For example, an exterior surface of the gripper may have a texture (in the material of the gripper and/or via a coating) that facilitates gripping the handle when an operator's hands are wet. As another example, the gripper may include a coating (e.g., insulating) that maintains a lower temperature than the stem of the handle (e.g., since exposure to sun may heat the handle to temperatures that are uncomfortable to the touch).

In various implementations, the components of the valve may include any appropriate material for anhydrous ammonia applications. For example, the manual release member, handle, and breakaway member may include metal such as aluminum and/or stainless steel. In some implementations, the breakaway components may include a material selected for its ability to rupture (e.g., break) when subject to predetermined forces while being appropriate for use in anhydrous ammonia applications. For example, Teflon and/or Teflon coated breakaway components (e.g., breakaway insert and/or pin) may be utilized. The combination of the material utilized and dimensions of the walls surrounding cavities (e.g., proximate ends of the pin and/or breakaway insert) may be selected to generate breakaway components that rupture at a predetermined force.

The stops may have curved or rounded edges proximate ends 160c, 160d of the breakaway insert and/or wall 142c of the pin to inhibit wear. Since the manual actuator can be triggered repeatedly without replacing some or all of the components, wear may be decreased by utilizing stops that do not cut into the walls of the cavities in the breakaway insert and/or pin.

In some implementations, breakaway components may include a breakaway wall with an opening (e.g., a slot, orifice, etc.) that allows the pull cord to pass through the breakaway wall. The stop of the pull cord may have a length and/or width that is greater in size than the opening in the breakaway wall to inhibit the pull cord from slipping out of the breakaway component. When excessive forces (e.g., forces greater than a predetermined force) are applied by the stop of the pull cord to the breakaway wall, the breakaway wall may fail (e.g., break and allow the pull cord segment to be uncoupled from, for example, the breakaway member). The excessive force may then not be transferred to other components that may be more expensive or difficult to replace (e.g., than the breakaway component).

In some implementations, the bracket may have dimensions such that deformation (e.g., due to an operator leaning on the bracket, rollover of a nurse tank, etc.) is inhibited. For example, the bracket may have a predetermined thickness, which inhibits deformation during use, common accidents and/or common misuses (e.g., weight of a user leaning on bracket, rollover, etc.)

In some implementations, the handle may have a fixed arc through which it pivots (e.g., moves). The movement of the handle may be similar to the movement of the connection member 116 (e.g., the connection member 116, which may be a portion of the valve positioning member) may rotate and the handle coupled to the connection member may rotate). The handle may have a first position, which corresponds to the valve being open. The handle may have a second position, to which it can pivot (e.g., counterclockwise from the first position), corresponding to the valve being closed. The first position and the second position may be approximately the maximum distance between which the handle can pivot. In some implementations, the handle and the valve may be configured such that the valve may be closed prior to the handle reaching the second position (e.g., the handle is capable of being pivoted more counterclockwise after the valve is closed). For example, the valve may fully close at a point in the pivot of the handle between the first position and the second position. In some implementations, the valve may close when the handle is approximately 10 to approximately 40 degrees before the second position. The valve may close when the handle is approximately 35 to approximately 25 degrees from the second position (e.g., approximately 30 degrees). This early close valve assembly may inhibit leaks when the handle is not latched and/or locked (e.g., via one or more of the locking members). Since the valve is closed prior to the handle reaching the second position, minor fluctuations (e.g., due to jostling, failure to lock or latch, etc.) may not cause leaks.

Although FIGS. 4B, 4C, 4E5B, 5D, 5E, 7C8A, 8C, and 8D illustrate implementations of approximate dimensions (in inches) of one implementation of an example manual actuator and components thereof, other dimensions may be utilized as appropriate.

In various implementations, an anhydrous ammonia nurse tank valve assembly may include an anhydrous ammonia valve and a manual actuator. The valve may have a closed position and at least one open position. The valve may be coupled to the manual actuator such that the handle of the manual actuator can be used to adjust the position of the valve (e.g., open to closed and/or closed to open). When the handle is used by an operator to open the valve, the handle may be rotated from a first handle position to a second handle position and exert a force on a first end of a pin of the manual actuator that causes the pin to at least partially retract from a first pin position and the spring proximate an opposing end of the pin to compress. Once the handle is in the second position, the valve may be opened, and the handle may be disposed to the side of the pin. Thus, with the force removed, the spring may expand, and the pin may extend to the first pin position. The position of the pin may inhibit the handle from returning the first handle position. When the handle is used by an operator to close the valve, the handle may be rotated from a second handle position to a first handle position and exert a force on a first end of a pin of the manual actuator that causes the pin to at least partially retract from a first pin position and the spring proximate an opposing end of the pin to compress. Once the handle is in the first position, the valve may be closed, and the handle may be disposed to the side of the pin. Thus, with the force removed, the spring may expand, and the pin may extend to the first pin position. The position of the pin may inhibit the handle from returning the first handle position. In some implementations, a valve itself may hold the handle and the valve in the closed position (e.g., some types of spring valves). The manual actuator may also be capable of closing the valve remotely. An operator may pull the pull cord (e.g., by the loop) which retracts the pin from the first pin position (e.g., since the first stop exerts a force on the wall of the second end of the pin against the spring, causing the spring to compress). The retraction of the pin may allow the handle to automatically rotate (e.g., via the spring in the valve) to the closed position and close the valve. If an operator or external forces apply a force greater than a predetermined force on the pull cord, the pull cord may be released at the breakaway insert and/or pin, as described.

In various implementations, the described system and processes may be utilized in emergency shut off operations. For example, an operator may actuate the switch (e.g., pull a pull cord, etc.) to close a valve. If an excessive force has not been applied (e.g., causing rupture of one or more breakaway components), the valve may be reopened by rotating the handle to reopen the valve.

Although various components and portions thereof have been illustrated as with specific shapes designated for housings, openings, and/or cavities, any appropriate size and/or shape may be utilized. For example, although the openings (e.g., in the bracket and/or handle) have been illustrated as including a circular cross-section, any appropriate regular or irregular shape may be utilized, such as oval, rectangular, etc. Although diameters have been referenced in relation to various components, components may have any appropriate shape. Thus, in these other appropriate shapes of the component, the described diameter may reference a width instead. The use of diameter is not intended to be limiting to the shape of the component referenced.

In various implementations, couplings may include threads, openings and fasteners, quick connectors, other coupling facilitators, etc. as appropriate. For example, the valve may include openings with threads to receive hoses (e.g., receive threads from connectors of the hose) and/or couple with a tank. As another example, the hose may couple to a valve via a quick connector. The coupling may be direct and/or indirect, as appropriate. For example, a connector may be utilized to couple hoses and valves. The connector may allow different size hose(s) to be coupled with a valve.

In some implementations, the manual actuator may be utilized with a spring valve. For example, a valve in which a spring in an initial position holds the valve in a closed position and when a force is applied to a handle of the manual actuator, the spring is extended as the valve is opened. When this force is released (e.g., when the pull cord is pulled and the pin in the manual release component is retracted), the spring of the valve may automatically return the valve to a closed position. The spring may be selected such that the force of the spring returning to the initial position is capable of closing the valve. In some implementations, the spring of the valve may be compressed when the valve is opened by the movement of the handle of the valve. When the force is released from the handle the compressed spring may return to its initial position and this resulting force may cause the valve to return to a closed position.

Although valves with springs that return the valve to closed positions have been described, the electronic actuator may be utilized with springs that return to the open position (e.g., the spring-loaded to stay open). These spring open-type valves may be utilized in applications where shutting off anhydrous ammonia can cause dangerous situations (e.g., build up in pressure and/or concentration of anhydrous ammonia). A user may rotate the handle of the electronic valve to close the valve and/or may utilize the pull cord to trigger an automatic opening of the valve.

In some implementations, the valve may not be a spring valve. The manual actuator may include a spring to perform one or more of the operations of a spring of a valve, automatically closing or opening the valve when a force to a valve handle (e.g., that opens or closes the valve) is removed. In some implementations, a spring may be coupled to the handle (e.g., between the bracket and the spring) such that the spring is extended or compressed to when the handle is moved between an initial position and another position by an application of force (e.g., by a user). For example, a spring (e.g., different from the spring of the pin) of the manual actuator may be compressed or expanded to open the valve. As another example, the spring may be compressed or expanded to close the valve. The position of the pin may inhibit movement from this position once the force is released, in some implementations The described valve assemblies may be utilized in agricultural and/or industrial settings. For example, the valve assemblies may be utilized in nurse tank(s). An operator may drive a vehicle coupled to one or more nurse tanks with one or more of the described valve assemblies. The valve assemblies may feed anhydrous ammonia from the nurse tanks to field applicator(s). In some implementations, one or more of the described valve assemblies may be utilized in storage tanks (e.g., in industrial and/or agricultural settings). The valve assemblies may be utilized to feed anhydrous ammonia from the storage tank to smaller tanks (e.g., nurse tanks, consumer tanks, tanks on vehicles, etc.). In some implementations, the described valve assemblies may be utilized in blending facilities (e.g., with aqueous ammonia). The safety of the operation may be increased and/or costs of operation may be decreased by use of the described valve assemblies.

The described processes may be implemented by the various described systems, such as systems 100. In addition, various operations may be added, deleted, and/or modified. In some implementations, the process may be performed in combination with other processes and/or portions thereof. For example, more than one type of emergency shut offs operation may be implemented approximately concurrently/ or sequentially. For example, during a fire, one or more tanks may be shut off via the associated switch(es) and/or fire fuse(s) in a valve may shut off a valve. As another example, the manual actuator may be coupled to one or to more than one valve. The switch may thus operate a single tank and/or more than one tank in conjunction and/or separately.

In some implementations, the pull cord may control one tank or more than one tank.

Although users have been described as a human, a user may be a person or a group of people.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a pull cord" includes a combination of two or more pull cords and reference to "a valve" includes different types and/or combinations of valves. As another example, a "breakaway wall" may a combination of one or more breakaway walls. As another example, a reference to a breakaway material includes different types and/or combinations of materials with properties that allow breakage under a predetermined force. As another example reference to a fastener may include different types and/or combinations of fasteners.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An actuator assembly for controlling a valve connected to an anhydrous ammonia tank, the assembly comprising:
   a handle that is couplable to the valve, wherein the handle actuates the valve between an open position and a closed position;
   a manual release, wherein the manual release comprises:
      a housing that is couplable to the valve;
      a pin extending at least partially from the housing, wherein the pin is configured to engage with the handle to maintain the valve in the open position; and
      a pull cord attached to the pin, wherein activation of the pull cord enables the actuation of the valve to a closed position.

2. A method for controlling a valve connected to an anhydrous ammonia tank, the method comprising:
   actuating the valve between an open position and a closed position using a handle that is coupled to the valve;
   engaging a pin extending at least partially from a housing of a manual release with the handle to maintain the valve in the open position; and
   activating a pull cord attached to the pin to enable the actuation of the valve to a closed position.

3. The actuator assembly of claim 2, wherein the handle is rotatably couplable to the valve.

4. The actuator assembly of claim 2, wherein the pin comprises:
   a tapered end to facilitate smooth engagement and disengagement with the handle; and
   a flange, distal from the tapered end, to prevent overextension from the housing.

5. The actuator assembly of claim 4, wherein the pull cord includes a looped end for easy gripping and activation.

6. The actuator assembly of claim 2, wherein the manual release further comprises:
   a spring mechanism that is configured:
      to retain the pin in an extended position such that the pin may engage the handle to maintain the valve in the open position and
      to retract the pin under an applied force such that the pin may disengage the handle to actuate the valve to the closed position.

7. The actuator assembly of claim 6, wherein the housing includes an access panel for maintenance of the spring mechanism and the pin.

8. The actuator assembly of claim 6, wherein the spring mechanism comprises a compression spring that exert a force on the pin at least equal to the applied force.

9. The actuator assembly of claim 6, wherein the spring mechanism includes a tension adjustment feature that is adjustable to vary a force required to retract the pin.

10. The actuator assembly of claim 6, wherein the pull cord further comprises:
    a first segment;
    a second segment; and
    a breakaway member that releasably couples the first segment to the second segment, wherein the breakaway member is configured to decouple the first segment from the second segment when subjected to a predetermined force.

11. The actuator assembly of claim 10, wherein the first and second segments of the pull cord are connected via a magnetic coupling in the breakaway member.

12. The actuator assembly of claim 10, wherein the breakaway member comprises a frangible coupling designed to fracture under the predetermined force.

13. The method of claim 12, further comprising:
retracting the pin under an applied force to disengage the handle and actuate the valve to the closed position.

14. The method of claim 13, further comprising:
decoupling the first segment from the second segment using the breakaway member when subjected to a predetermined force.

15. The method of claim 12, further comprising:
accessing the spring mechanism and the pin through an access panel in the housing to adjust tension of the spring mechanism and vary a force required to retract the pin.

16. The actuator assembly of claim 10, wherein the applied force is greater than the predetermined force.

17. The method of claim 16, wherein the spring mechanism comprises a compression spring exerting a force on the pin at least equal to the applied force.

18. The method of claim 10, wherein actuating the valve includes rotating the handle that is rotatably coupled to the valve.

19. The method of claim 10, further comprising:
retaining the pin in an extended position using a spring mechanism to engage the handle and maintain the valve in the open position.

20. The method of claim 10, wherein the pull cord comprises a first segment and a second segment coupled by a breakaway member.

* * * * *